(12) United States Patent
Cairo et al.

(10) Patent No.: US 7,966,889 B2
(45) Date of Patent: Jun. 28, 2011

(54) METHOD OF MEASURING STRAIN IN A FLEX HOSE OR OTHER FLEXIBLE MEMBER

(75) Inventors: Ronald R. Cairo, Greer, SC (US); Timothy Channel, Simpsonville, SC (US); Thomas Cookson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 2 days.

(21) Appl. No.: 12/213,537

(22) Filed: Jun. 20, 2008

(65) Prior Publication Data
US 2009/0314097 A1    Dec. 24, 2009

(51) Int. Cl.
*G01B 11/16* (2006.01)
(52) U.S. Cl. ............................. 73/762; 73/760
(58) Field of Classification Search .............. 73/760–860
See application file for complete search history.

(56) References Cited

U.S. PATENT DOCUMENTS

| | | | |
|---|---|---|---|
| 3,927,565 A * | 12/1975 | Pavlin et al. .............. 73/861.355 |
| 4,734,577 A | 3/1988 | Szuchy | |
| 4,781,056 A | 11/1988 | Noel et al. | |
| 4,788,868 A | 12/1988 | Wilk | |
| 4,825,701 A | 5/1989 | Holtslander | |
| 4,841,778 A | 6/1989 | Butler et al. | |
| 5,120,089 A * | 6/1992 | Guttag ............................ 283/71 |
| 5,289,722 A * | 3/1994 | Walker et al. ................... 73/775 |
| 5,858,291 A * | 1/1999 | Li et al. .......................... 264/105 |
| 6,044,713 A | 4/2000 | Bassily | |
| 6,056,436 A | 5/2000 | Sirkis et al. | |
| 6,120,634 A * | 9/2000 | Harrold et al. ................. 156/203 |
| 6,227,057 B1 | 5/2001 | Haas | |
| 6,255,728 B1 * | 7/2001 | Nasiri et al. ................... 257/704 |
| 6,423,019 B1 * | 7/2002 | Papay et al. ...................... 602/17 |
| 6,799,481 B2 * | 10/2004 | Nieding et al. ........... 73/862.338 |
| 6,947,637 B2 | 9/2005 | Smith | |
| 7,040,156 B2 | 5/2006 | Crockford | |
| 7,156,918 B2 * | 1/2007 | Marks ........................... 177/168 |
| 7,347,845 B2 * | 3/2008 | Zajaczkowski .......... 604/385.01 |

* cited by examiner

*Primary Examiner* — Max Noori
(74) *Attorney, Agent, or Firm* — Nixon & Vanderhye, P.C.

(57) ABSTRACT

A method of detecting excessive strain in an elongated flexible member comprising: (a) applying at least one strain-detecting strip to the flexible member in an area that will be subject to bending in installation or use; (b) installing the flexible member in place; and (c) after installation, inspecting the strain-detecting strip for signs of excessive strain in the flexible member.

7 Claims, 4 Drawing Sheets

METHOD OF MEASURING STRAIN IN A FLEX HOSE OR OTHER FLEXIBLE MEMBER

This invention relates to a method for detecting an excessive amount of stretch or strain in a metal flex hose or other flexible conduit.

BACKGROUND OF THE INVENTION

Metal flex hoses are used in various applications, including gas turbine plants where they are used to route compressed air of various temperatures and pressures from point A to point B. Hose routing can be quite complex depending on the location and geometry of each attachment point or termination point. Such complex routing in typical field installations can lead to incorrectly installed hoses that are over-strained and/or over-stressed, leading to premature failure.

There remains a need for a simple but rapid, reliable and quantifiable method for measuring the overall strain condition in a metal flex hose as installed.

BRIEF DESCRIPTION OF THE INVENTION

In one aspect, the present invention relates to a method of detecting excessive strain in an elongated flexible member comprising: (a) applying at least one strain-detecting strip to the flexible member in an area that will be subject to bending in installation or use; (b) installing the flexible member in place; and (c) after installation, inspecting the strain-detecting strip for signs of excessive strain in the flexible member.

In another aspect, the invention relates to a method of detecting excessive strain in an elongated flexible member hose comprising: (a) before or after installation, installing a collar over the flexible member, the collar sized and shaped to slide over the flexible member in a substantially straight condition with a specified clearance; (b) after hose installation, sliding the collar along the flexible member to detect presence of bends or kinks of a magnitude such that the collar will not pass over such bends or kinks, thereby indicating improper installation.

The invention will now be described in connection with the drawings identified below.

DETAILED DESCRIPTION OF THE INVENTION

Figure 1:
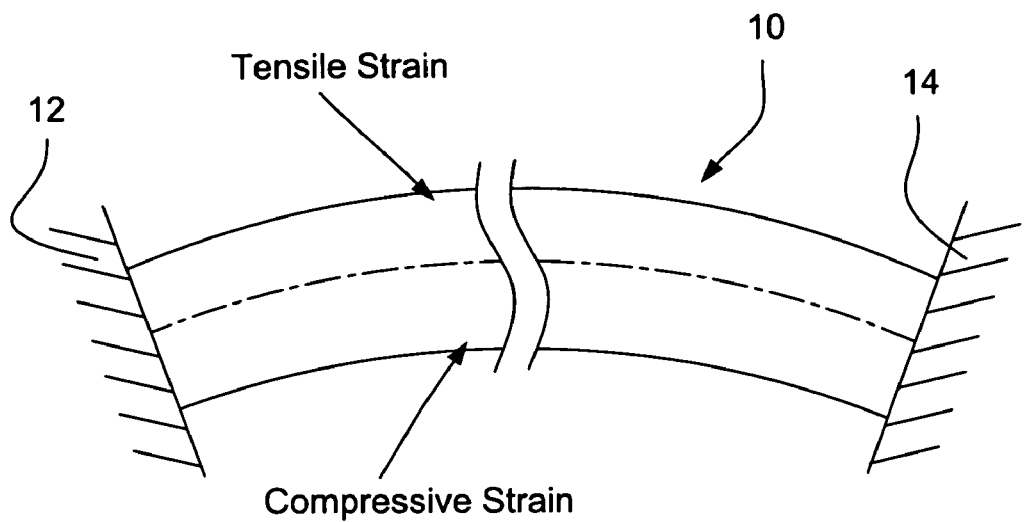
FIG. 1 is a schematic illustration of a flex hose subject to stresses and strains resulting from a one-way bend in the hose.
Figure 2:
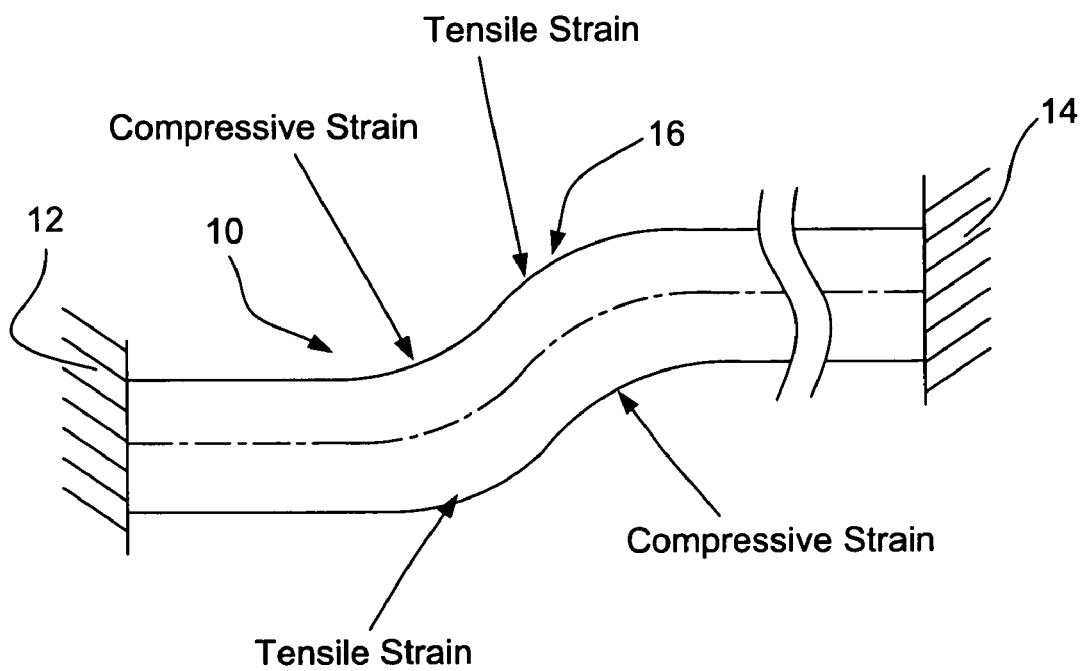
FIG. 2 is a schematic illustration similar to FIG. 1, but illustrating an S-bend in the flex hose.

FIGS. 1 and 2 illustrate a flexible hose mounted between two fixed points, demonstrating the types of potential bending that could occur during installation of the hose, and that could result in failure of the hose. In FIG. 1, the flex hose 10 is secured between fixed points 12 and 14. The hose is shown in a position in which potentially damaging tension or compression in excessive amounts could result in rupture of the hose.

In FIG. 2, the hose 10 is shown to incorporate a kink or reverse curvature, S-bend, which again, could result in rupture of the hose.

In accordance with exemplary but nonlimiting implementations described herein, several alternative methods are provided for detecting and/or quantifying the amount of stretch or strain in flex hoses, including metal flex hoses of the type that are utilized to carry compressed air in gas turbine engine plants. The invention is applicable to other elongated flexible members such as tubes, conduits or the like.

Figure 3:
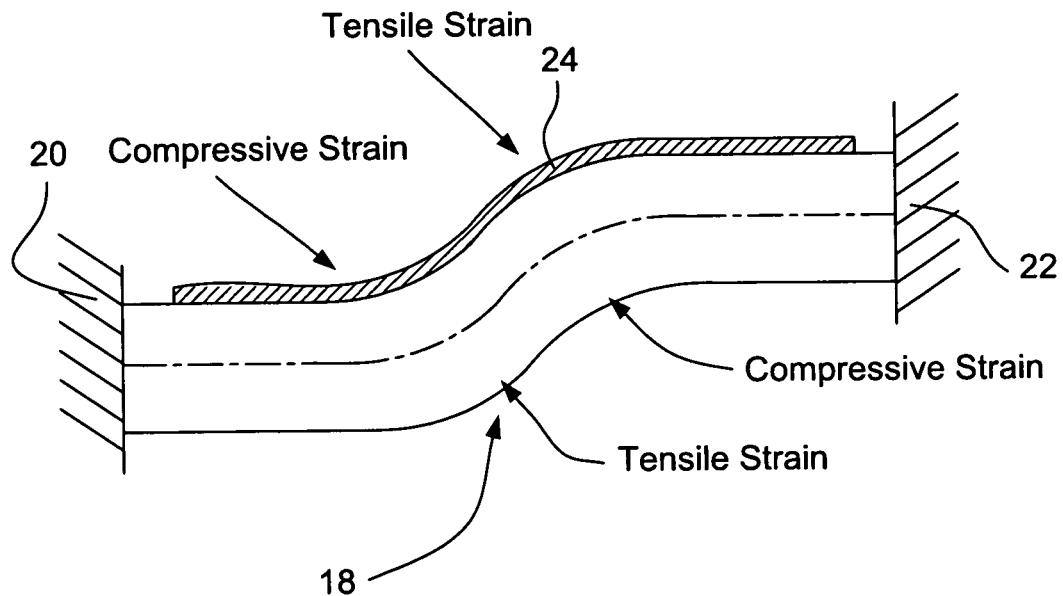
FIG. 3 is a schematic illustration of a flex hose having a reverse curvature, S-bend therein, but with a sensor strip applied thereto in accordance with an exemplary but nonlimiting implementation of the invention.

In one exemplary implementation, one or more calibrated, strain-indicating and substantially transparent polymer strips 24 are adhered to the exterior of the flex hose 18 (one shown in FIG. 3) prior to installation. If the hose and applied polymer strip strain over a certain threshold level, the transparent polymer strip crazes and becomes opaque, giving an immediate visual indication of improper installation.

In a variation of this implementation, a color change polymer is employed in the one or more strips 24, so if the hose 18 and polymer strip(s) 24 strain over the threshold amount, the polymer strip(s) 24 will craze and change color, thereby also giving an immediate visual indication of improper installation.

In another exemplary implementation, the calibrated strain-indicating polymer strip(s) 24 are adhered to the exterior of the hose 18 prior to installation, but in this instance, each of the one or more strips 24 is constructed of two chambers, separated by a strain sensitive membrane. The chambers are filled with reacting fluids. If the hose and applied polymer strip strain over the threshold level or amount, the membrane breaks and allows the fluid in the two chambers to mix and change color, again giving an immediate visual indication of improper installation.

In another exemplary implementation, the calibrated strain-indicating polymer strip(s) 24 are also constructed of two chambers separated by a strain sensitive membrane, but with the chambers filled with reacting fluids. In this instance, however, due to the composition of the reacting fluids, if the hose and applied polymer strip strain over the threshold level, the membrane breaks and allows the fluids to mix and thereby generate light, again giving an immediate visual indication of improper installation.

In yet another exemplary implementation, the transparent polymer strip(s) 24 craze when over-strained, and thus reduce the ability to transmit light. An external device may be used to measure the change in light transmission, giving an indication of improper installation.

In still another exemplary implementation, calibrated strain-indicating, electrically-resistive strip(s) 24 is (are) adhered to the interior or exterior of the hose 18 prior to installation and wired in such a manner as to quantify the amount of strain present in the hose after installation. A resistive value over a certain threshold limit would indicate an improper hose installation.

Figure 4:
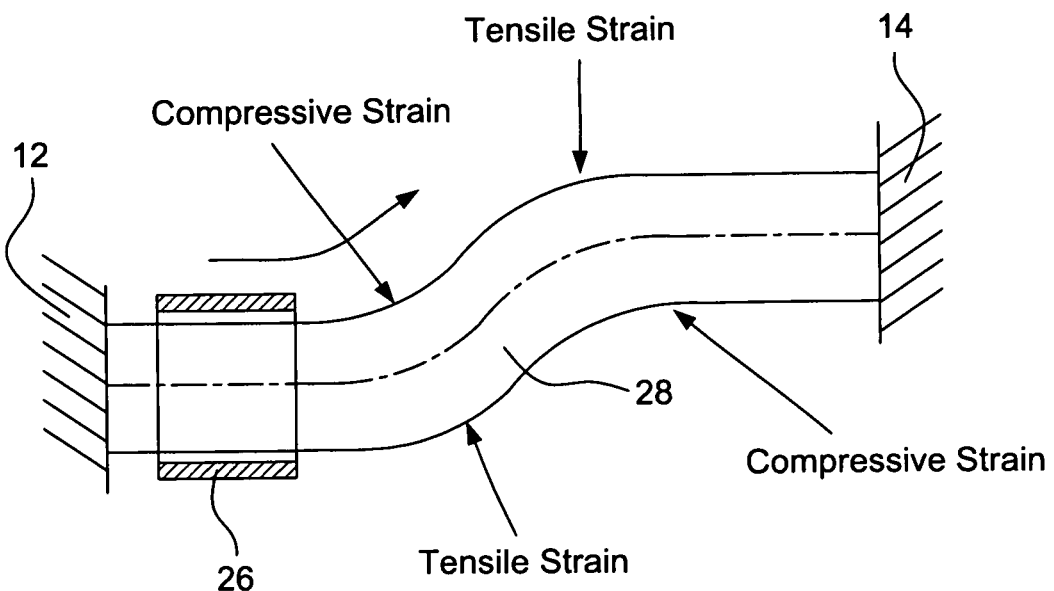
FIG. 4 is a schematic illustration similar to FIG. 3 but wherein the sensing strip is replaced by a split collar sized and shaped to detect excessive bends or kinks in the flex hose.

With reference to FIG. 4, in another exemplary implementation, one or more hinged split collars 26 of suitable length and ID or inside diameter (as determined by the hose diameter and the excessive strain threshold), are provided in kit form. Each collar can be installed over the flex hose 28 before or after installation and run along its length to check for bend radius. The length and ID of the collar are thus chosen such that only if the bend is excessive will there be interference in the sliding motion of the collar. For example, the inside diameter of the collar may be chosen to provide an acceptable clearance, based on permissible curvature in the hose. A typical range is 0.5 to 1.5%>hose outer diameter. Threshold interference in this regard, may be defined as desired, and may include a complete stoppage of the collar, i.e., where the collar cannot pass over the bend or kink. Such interference, however defined, indicates improper installation.

Figure 5:
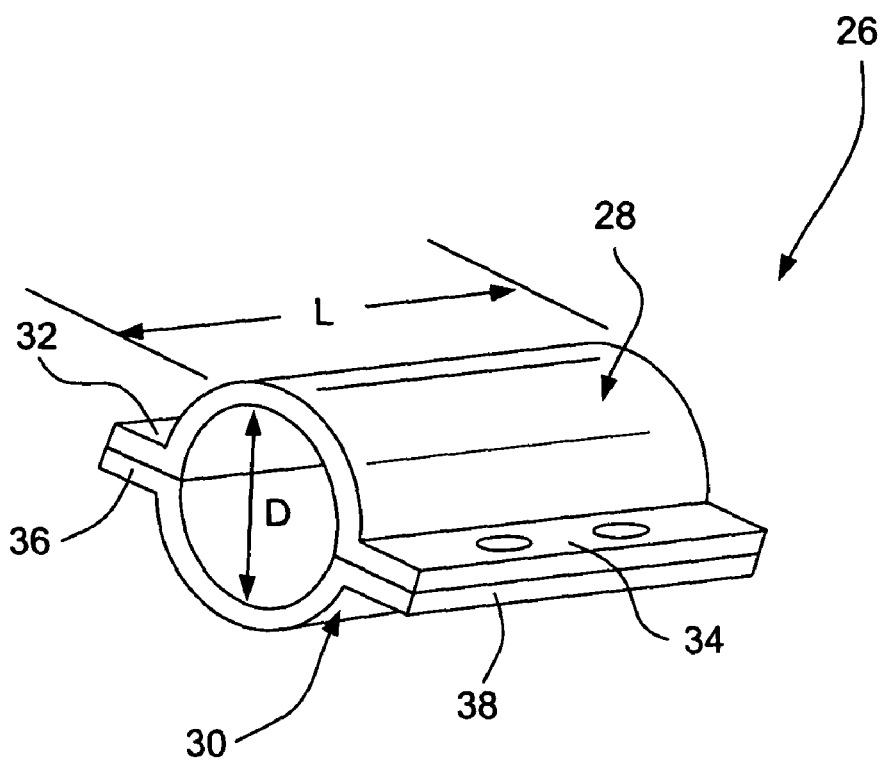
FIG. 5 is a perspective view of a split collar of the type that may be used in the arrangement shown in FIG. 4.

FIG. 5 illustrates the split collar 26 in enlarged form, with collar halves 28, 30 having complimentary flanges 32, 34 and 36, 38, respectively, that may be used to hold the collar on the hose 28 via use of any suitable fasteners.

In use, the collar is assembled on the hose after installation of the hose and moved along the length of the hose to detect impermissible kinks or bends as described above.

Figure 6:
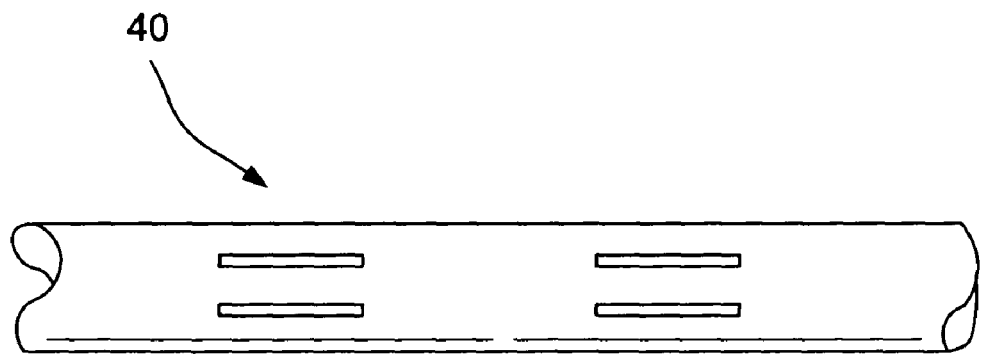
FIG. 6 is a partial perspective view of a flex hose to which multiple sensor strips have been applied in accordance with another exemplary implementation of the invention.

FIG. 6 illustrates a hose 40 with a plurality of sensing strips 42 applied in both axially and circumferentially-spaced arrays. The strips 42 may be sized to crack visually or "electrically" when subjected to excessive curvature, and hence strain, in the hose. Visual indication, as mentioned above, may be based on color change, light emission or the like, and electrical indication may be based on resistivity increase due to the bend or kink.

Figure 7:
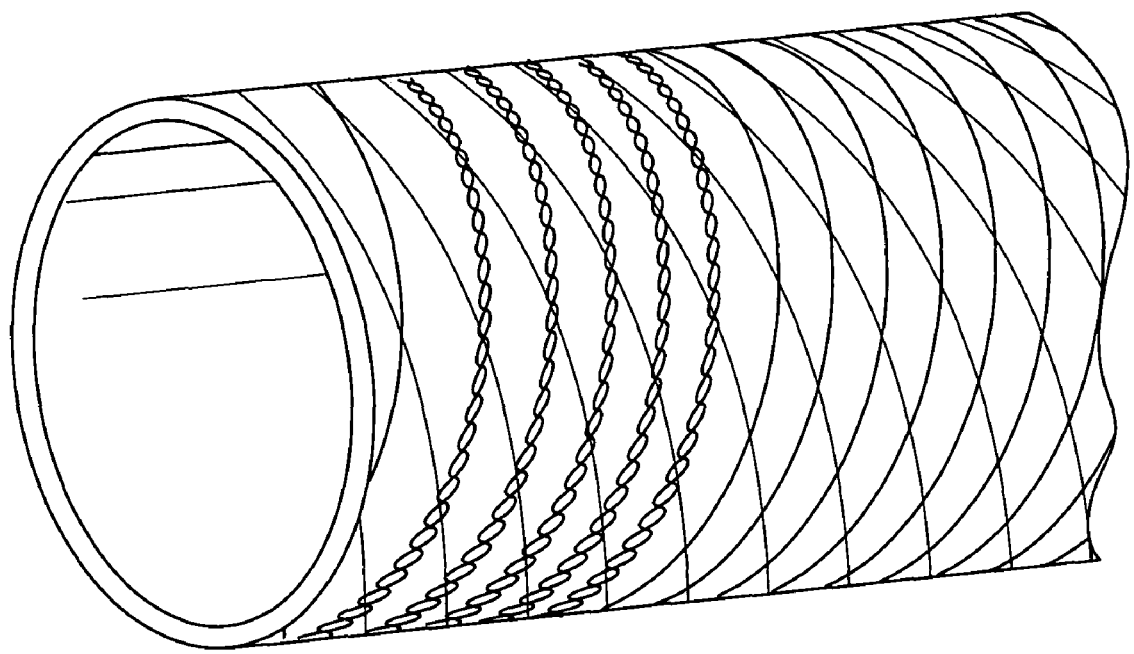
FIG. 7 is a partial perspective view of a flex hose in which a sensing wire has been integrally woven in accordance with still another exemplary implementation of the invention.

FIG. 7 illustrates another implementation where a wire, such as a fiber optic wire 44 is woven or braided integrally with the hose 46. Wire 44 could also be an electrically resistive wire as described above. In either case, excessive strain in the hose will trigger an indicator of improper installation.

In all cases, thresholds may be determined based on specific hose compositions, environments, and other criteria regarding what is considered excessive strain, and the various indicators calibrated accordingly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of detecting excessive bending strain in an elongated flexible conduit in a power generation plant comprising:
    (a) applying at least one substantially transparent strain-detecting polymer strip to the flexible conduit in an area that will be subject to bending during installation or use;
    (b) installing the elongated flexible conduit in place in the power generation plant; and
    (c) after installation, inspecting said strain-detecting polymer strip for excessive bending strain in the elongated flexible conduit, wherein said polymer strip becomes opaque when said elongated flexible conduit is subjected to bending strain over the predetermined threshold level.

2. A method of detecting excessive bending strain in an elongated flexible conduit in a power generation plant comprising:
    (a) applying at least one substantially transparent strain-detecting polymer strip to the flexible conduit in an area that will be subject to bending during installation or use;
    (b) installing the elongated flexible conduit in the power generation plant; and
    (c) after installation, inspecting said strain-detecting polymer strip for excessive strain in the elongated flexible, wherein said polymer strip becomes opaque when said elongated flexible conduit is subjected to bending conduit strain over the predetermined threshold level;
        wherein said at least one substantially transparent strain-detecting polymer strip includes a pair of chambers filled with reactive fluids and separated by a strain sensitive membrane wherein said membrane is designed to rupture when subjected to bending strain over the predetermined threshold level, causing said fluids to mix and provide a visual indication of excessive bending strain.

3. The method of claim 2 wherein when said fluids mix, they generate light.

4. The method of claim 2 wherein when said fluids mix, they change color.

5. The method of claim 1 wherein said elongated flexible conduit comprises a metal hose.

6. A method of detecting excessive strain in an elongated flexible metal hose in a gas turbine plant where the metal hose is used to carry compressed air, the method comprising:
    (a) applying at least one substantially transparent strain-detecting strip to the elongated flexible metal hose in an area that would be subject to bending during installation or use;
    (b) installing the elongated flexible metal hose in the gas turbine plant; and
    (c) after installation, inspecting the substantially-transparent strain-detecting strip for excessive bending strain in the elongated flexible metal hose wherein the at least one substantially transparent strain-detecting strip becomes opaque when the elongated flexible metal hose is subjected to bending strain over the predetermined threshold level.

7. The method of claim 2 wherein said elongated flexible conduit comprises a metal hose.

\* \* \* \* \*